United States Patent
Griffith et al.

(10) Patent No.: US 6,459,951 B1
(45) Date of Patent: Oct. 1, 2002

(54) DIRECT LASER ADDITIVE FABRICATION SYSTEM WITH IMAGE FEEDBACK CONTROL

(75) Inventors: Michelle L. Griffith, Albuquerque, NM (US); William H. Hofmeister, Nashville, TN (US); Gerald A. Knorovsky, Albuquerque, NM (US); Danny O. MacCallum, Edgewood, NM (US); M. Eric Schlienger, Albuquerque, NM (US); John E. Smugeresky, Pleasanton, CA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/394,184

(22) Filed: Sep. 10, 1999

(51) Int. Cl.[7] .................................................. G06F 19/00
(52) U.S. Cl. ...................... 700/166; 700/118; 700/119; 219/121.6; 427/8; 156/64
(58) Field of Search .............................. 700/49, 50, 42, 700/118–120, 166, 123, 182; 219/121.63, 121.6, 121.62, 121.65; 156/64; 427/8, 586, 595, 596; 706/900, 904

(56) References Cited

U.S. PATENT DOCUMENTS

| | | | | |
|---|---|---|---|---|
| 4,663,513 A | * | 5/1987 | Webber | 219/121.6 |
| 4,915,757 A | * | 4/1990 | Rando | 156/64 |
| 5,517,420 A | * | 5/1996 | Kinsman et al. | 700/166 |
| 5,786,023 A | * | 7/1998 | Maxwell et al. | 427/8 |
| 6,046,426 A | * | 4/2000 | Jeantette et al. | 219/121.63 |
| 6,122,564 A | | 9/2000 | Koch et al. | 700/123 |
| 6,311,099 B1 | * | 10/2001 | Jasper et al. | 700/166 |

* cited by examiner

Primary Examiner—Leo Picard
Assistant Examiner—Steven R. Garland
(74) Attorney, Agent, or Firm—Brian W. Dodson (57) ABSTRACT

A closed-loop, feedback-controlled direct laser fabrication system is disclosed. The feedback refers to the actual growth conditions obtained by real-time analysis of thermal radiation images. The resulting system can fabricate components with severalfold improvement in dimensional tolerances and surface finish.

14 Claims, 5 Drawing Sheets

DIRECT LASER ADDITIVE FABRICATION SYSTEM WITH IMAGE FEEDBACK CONTROL

This invention was made with Government support under Contract DE-AC04-94DP85000 awarded by the U.S. Department of Energy. The Government has certain rights in the invention.

BACKGROUND

The present invention relates generally to additive fabrication equipment, and more specifically to adaptations whereby such equipment can be operated under closed-loop feedback control in response to changes in an image of the immediate growth environment. Such adaptations can greatly improve the dimensional tolerance and minimum feature size attainable by such machines.

Laser engineering net shape (LENS) fabrication is an example of a laser-driven additive fabrication technique, wherein a high-energy density laser beam is used to drive localized deposition of material on a surface, and by repeating this process to build up a desired component. Such additive fabrication techniques stand in contrast to traditional fabrication techniques, in which material is removed from an original billet until the desired part remains. LENS fabrication is a promising manufacturing technology, which has the potential to significantly reduce the length of time required to go from initial concept to finished part. Note that the general principles of the present invention also apply to direct fabrication technologies in which the laser is substituted by other sources of controllable, concentrated energy, such as particle beams, plasma beams, and electrical arcs.

In the LENS process, a component is fabricated by focusing a laser beam onto a locus on a growth surface so as to create thereabout a molten pool. The locus is then moved along the growth surface with a speed called the traverse velocity, pulling along with it the molten pool, while a growth material (often a fusible powder, although feed wire has been used) is injected into the molten pool. A portion of the growth material melts and becomes incorporated in the molten pool. As only enough heat is applied to maintain a given volume of liquefied material, the excess growth material is deposited onto the growth surface as the locus moves. The amount and type of material added to each point of the growth surface can be varied, and numerous layers can be grown atop the original layer, leading to additive fabrication of the desired component.

The LENS fabrication approach has proven to be quite flexible. Materials including steel alloys, titanium alloys, and Ni-based superalloys have proven well suited to the technique. In addition, growth involving graded material compositions and highly detailed structural configurations, including buried hollow structures, have been demonstrated.

Lens fabrication takes place at speeds which are practical for a wide variety of high-value components. For example, a laboratory-scale LENS apparatus (laser power ~500–1000 watts continuous) can write a line several hundred microns thick and wide, and composed of steel, at a rate of about 2 meters/minute. The amount of steel added in an hour's operation is then about 100–150 grams, meaning that even a small LENS apparatus can fabricate components (e.g., precision molds and dies) having a high enough value to justify the cost of the process. The LENS process is also capable of creating objects with unusual compositions, structures, and/or graded compositions which are nearly impossible to fabricate using other techniques.

The LENS process is particularly useful if it can be used to produce components which are essentially ready for use, i.e., in which the dimensional tolerances, surface finish, and global heat treatment are satisfactory for the intended use. The final dimensional and polishing steps are usually the most costly in conventional fabrication. A commonly mentioned candidate is a die or mold, which might require dimensions accurate to 10 microns, and a surface finish of a micron or less.

This level of precision is very difficult, and perhaps impossible, to achieve in the LENS process, in which the molten pool typically has dimensions of several hundred microns. Even small variations in process parameters will introduce errors which are much greater in size than the required tolerances. However, proper control of the operation of a LENS system offers the potential to reduce severalfold the scope of the precision finish machining required, a result greatly desired by end users.

The process parameters of a LENS system, or fabrication system of similar type, are the instantaneous operating parameters of the apparatus. These would include such characteristics as the output power of the laser, the laser power actually directed onto a locus on the growth surface, the rate at which growth material is added to the molten pool surrounding the locus on the growth surface, the path and velocity of the locus about the growth surface, time and amount of z-axis adjustments, rate of flow of cooling gas onto the locus, and so on.

In any given apparatus, some of these process parameters will be separately controllable, and others will be substantially fixed during operation. Those parameters which can be adjusted en passant during an ongoing fabrication process are termed controllable parameters.

Distinguished from the process parameters, which go to the description of the state of the apparatus and its alterations during the growth process, are the intrinsic parameters. Intrinsic parameters describe the environment within which the growth process is actually taking place, and include such information as temperature distribution on the growth surface, size and shape of the molten pool, maximum degree of pool superheating, the trailing thermal gradient (the rate at which temperature returns to ambient along the path taken by the locus), area of specific isotherms, thickness of the growth layer, depth of penetration of growth-related thermal transient, and the like. The common feature is that the intrinsic parameters are affected by the state of the LENS apparatus, but cannot be directly controllable parameters. E.g., the temperature at the locus cannot be set as a controllable parameter, but represents a balance between several process parameters and material parameters, including laser power, velocity of locus, material addition rate, thermal conductivity of the various materials near the locus, and so on.

The limitations of open-loop LENS processes can easily be observed. By open-loop, we mean setting and maintaining the process parameters without real-time feedback concerning the intrinsic parameters, i.e., concerning what is actually happening at the growth surface. Simply providing feedback control, e.g., to keep the laser power constant at the laser output, is still considered open-loop operation. Only when intrinsic parameters are measured and used to provide feedback information is the control system of the closed loop type.

Typical open-loop LENS results in tool steel and similar materials show dimensional variations parallel to the growth plane as small as 50 microns, and surface finish as good as 10–20 microns RMS, both reasonably encouraging values. However, variations in the height of a built-up component (e.g., a component a centimeter tall comprising perhaps 30–40 deposited layers) are more typically 2–300 microns in size. Such open-loop LENS techniques are simply not suited to most high-precision net-shape fabrication requirements, in that extensive finishing steps of conventional polishing and/or machining are required before a component is ready for use.

The examples of open-loop LENS fabrication described above suggest that there are sufficient reasons to seek a real-time feedback-based closed-loop control system for such fabrication methods. Among these are the need to reduce dimensional variations and surface finish of components, so that they can be used for their intended purpose with a minimum of (ideally with no) additional machining or finishing steps. Similarly, it can be beneficial during growth of a component with compositional gradients to control the process environmental parameters, i.e., the conditions at the point of growth, rather than the gross process parameters of the LENS apparatus. These factors can be degraded by poor control over the immediate thermal environment during the deposition process, and hence respond well to closed-loop control.

SUMMARY

The present invention is of an imaging-based feedback-controlled direct laser fabrication system for additive fabrication of net-shape or near-net-shape components. Such a system includes a conventional LENS apparatus (or similar system), which is operated by a feedback system. An imaging sensor directed at the molten pool on the growth surface provides feedback on the actual growth conditions. This type of additive fabrication system produces components with dimensional tolerances and surface quality superior to conventional LENS systems.

DETAILED DESCRIPTION

As part of the detailed description we will include the following details of a particular implementation of a direct laser fabrication apparatus, to which a feedback control system after the instant invention will be added. Neither this implementation nor the precise manner in which feedback control are intended to limit the scope of the instant invention.

Figure 1:
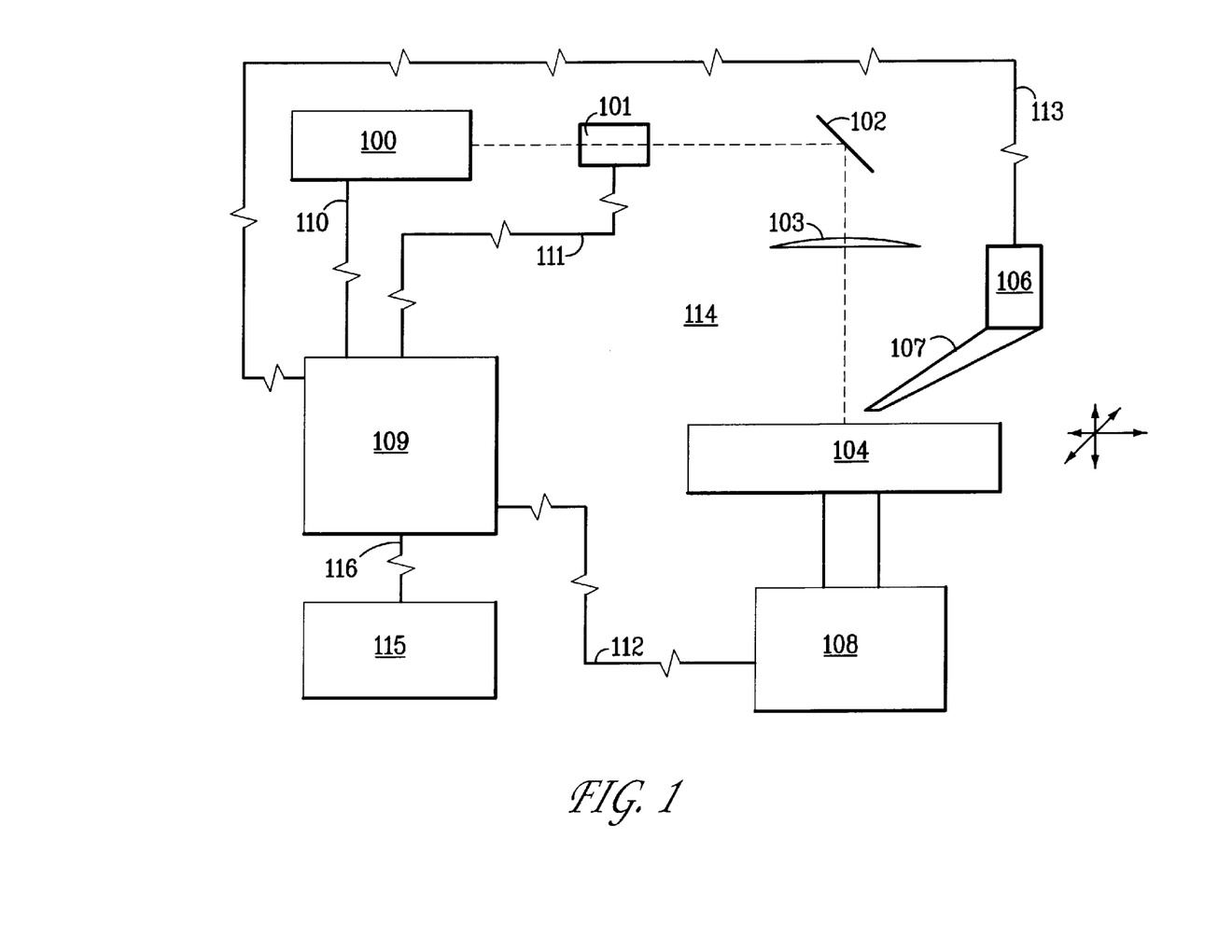
FIG. 1 shows a schematic diagram of a direct laser fabrication apparatus without feedback control.

FIG. 1 shows in schematic form the essential components of a particular implementation of a direct laser fabrication apparatus. Laser 100 sends an output beam through beam shaper and attenuator 101, whose output is directed to a locus 114 on a growth surface 104 by directing mirror 102 and focusing lens 103. Note that the purpose of focusing lens 103 is to produce a locus of a desired power density and size on the growth surface, and not to focus the laser output precisely at the growth surface. A feeder 106 provides a continuous flow of a powder from which the growing component is to be composed. This flow of powder is directed to the neighborhood of locus 114 by powder director 107. Although shown here as a single off-axis nozzle for clarity, a collection of off-axis nozzles whose spray patterns converge on the locus is often used instead.

The growth surface in the vicinity of the locus 114 melts, forming a small molten pool. As the flow of powder is incorporated into the molten pool, it melts therein and adds to the volume of the component. Since the size of the pool is determined by detailed thermal balance relations, when powder is added, some of the pool must freeze out, and this material adds to the thickness of the component. As the locus is moved about the surface of the component, this newly frozen material builds up the desired component.

Figure 2:
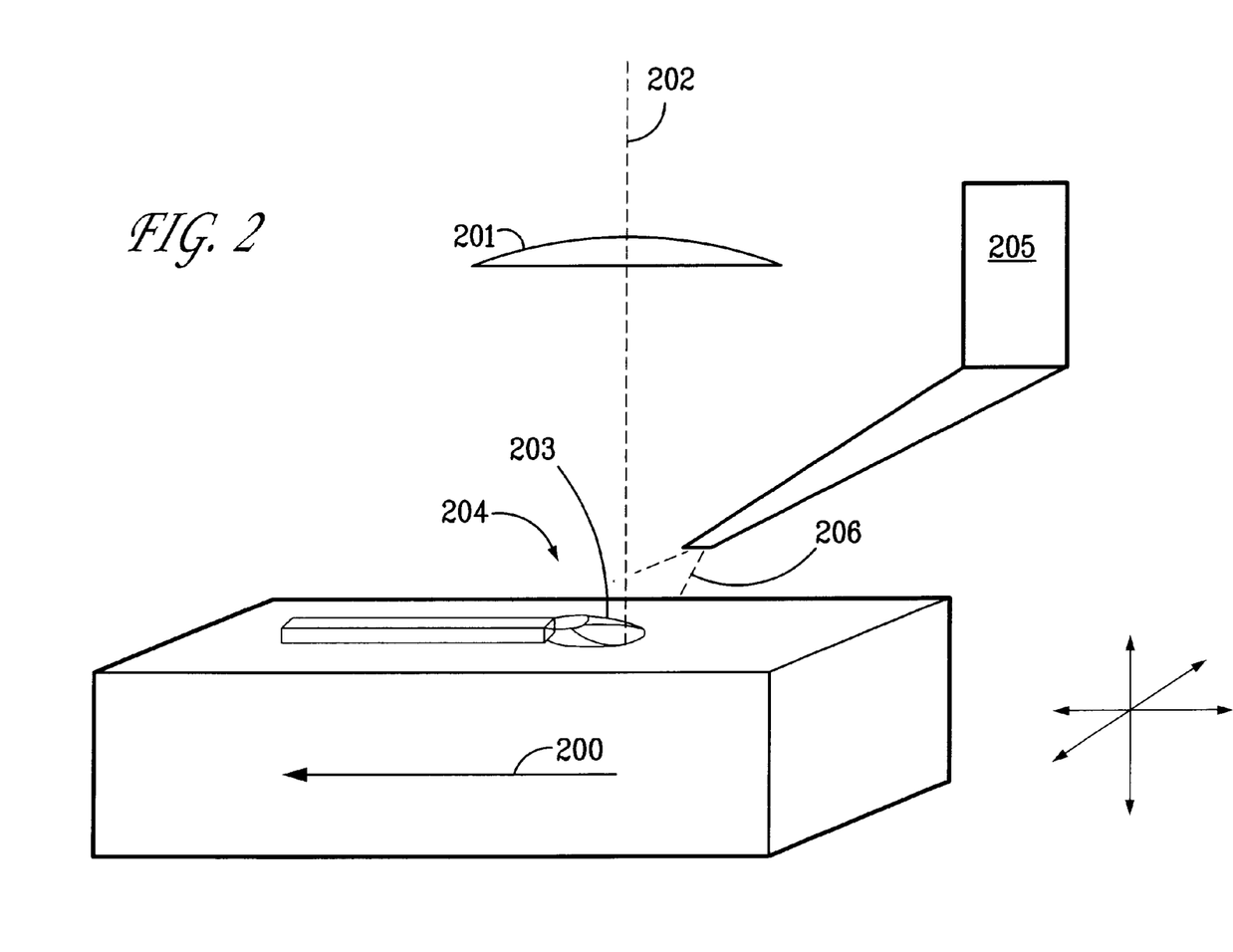
FIG. 2 shows a close-up image of a component being grown using direct laser fabrication, allowing the relative position and interaction of the various parts of the direct laser fabrication apparatus to be observed.

This can be seen in FIG. 2, where focusing lens 201 directs laser output 202 onto the surface of component 200 at locus 203, which here is small and circular in shape. The locus is in motion across the component surface, with the result that the molten pool 204 is extended into a roughly elliptical or oval shape. As feeder 205 delivers powder 206 to the vicinity of the molten pool 204, a portion melts and is incorporated into the molten pool, with the result that the component grows. By controlling the path traced by the locus, and the rate of powder incorporation, components with very complex three-dimensional shapes can be fabricated.

Note that the same apparatus can be used to provide rather complex heat-treatments to the component by shutting off the flow of powder. The concentration of laser power at the locus can then be used either to rapidly melt and cool the surface, or at a lesser intensity (or greater locus traverse velocity) to heat-treat the near-surface regions without actually melting them. In addition to varying the properties of the component through the heat-treating process, this procedure can be used to improve the surface finish of some types of components.

Returning to the apparatus of FIG. 1, the motion of the locus across the surface of the growing component is produced by multi-axis stage, or traverse mechanism, 108. Stage 108 is indicated to be an x-y-z axis stage, but other combinations of movements are also suited to this fabrication process. In particular, it can be useful to allow the growth surface to tilt relative to the incident laser beam and powder flow, as in this manner overhanging structures can be grown.

The operation of the above-described components of the direct laser fabrication apparatus can be centrally controlled, in this case this function is carried out by regulator 109. In the apparatus shown in FIG. 1, all functional components are shown as being subject to central control, whereas in practice this level of control is not required for fabrication of components. The output power of laser 100 is controlled by regulator 109 via signals sent over control line 110. The amount of attenuation produced by beam-shaper and attenuator 101 is controlled by regulator 109 via signals sent over control line 111. The rate of motion and the absolute position of the component is determined by the position of stage 108, which is controlled by regulator 109 via signals sent over control line 112. The rate of powder flow from feeder 106 is controlled by regulator 109 via signals sent over control line 113.

In turn, regulator 109 is instructed via control line 116 to adjust these various operating parameters so as to carry out a series of operating instructions contained within a scheduler 115. Scheduler 115 can take the form of a computer programmed with a particular fabrication program, or alternately can be a hard-wired controller.

The above is a particular implementation of a prior art direct laser fabrication apparatus, similar in all essential elements to that disclosed in copending application Ser. No. 08/676,547, now U.S. Pat. No. 6,046,426 filed on Jul. 8, 1996 by Jeantette et al. and assigned to Sandia Corporation, said application being hereby included in its entirety. It is clear that the performance of such an apparatus, especially concerning attainment of dimensional specifications, depends critically on the process parameters as a component is being grown.

A number of issues concerning planning the growth of a given component must be considered. The fabrication technique itself demands that substantially different process parameters be used near the edge of a growing component, on a thin vertical portion of a growing component, on a thin horizontal portion of a growing component, and on a thick essentially planar portion of a growing component. This requirement has to do with the different ways that component geometry affect the thermal balance relations which ultimately determine the size and shape of the melted pool. If more complex processing requirements are made, such as can appear when growing a component with regions of graded composition, the process parameters must again be specially tailored for the desired operation. There is also the possibility of dynamic instabilities, such as fluctuating pool diameter, spontaneously appearing during the growth process.

Analysis of the fabrication of a desired component at the level of the previous paragraph yields a set of idealized operating instructions. In other words, these effects can be modeled to sufficient accuracy that an ideal apparatus performing ideal operations on ideal source material will successfully reproduce the desired component.

In real operations, however, many sources of performance degradation appear which cannot be compensated for through prior planning. For example, a real apparatus will not follow a set of operating instructions precisely. There will be fluctuations in laser power, traverse speed, locus power intensity and size, and so on, which deflect the apparatus from the predetermined fabrication procedure. The result will be degradation of the fabrication process. Source materials will have variations in composition, shape, size, and surface contamination which will alter their response to the growth environment. Also, there can be geometric singularities where minor fluctuations in the planned growth process will diverge into dramatic errors. Finally, even minor consistent errors in the designed process can produce dramatic cumulative errors in the growing component, unless direct feedback to the actual growth process is provided and used for active control of the process.

As discussed earlier, this goal is not attained if feedback controls are placed on the apparatus above so that all of the controllable process parameters are held accurately at the levels called out by the operating instructions. A closed-loop control process which refers directly to the conditions on the growing component must be used.

In the instant invention, a closed-loop controller is added to the above apparatus, along with appropriate sensors to monitor intrinsic parameters describing the real-time growth environment in the neighborhood of the locus. By varying the controllable parameters to keep the intrinsic parameters constant (or in whatever relationship is appropriate for the desired fabrication process), the actual growth conditions at the surface remain substantially constant. As a result, a near-optimal combination of dimensional tolerance and fabrication rate can be obtained.

Unfortunately, it is far from obvious which intrinsic parameters should be included in the feedback information to improve the rather complex direct laser fabrication process, and how they couple to specific controllable parameters.

For example, the growth process could be monitored by measuring the total amount of optical radiation emitted in a given passband by the region surrounding the locus, e.g., by using a non-imaging bandpass photodetector directed at that region. Such a sensor is sensitive to changes in the average temperature in the neighborhood of the locus, and it might be thought that controlling, for example, the laser power so as to keep the sensor output constant would be an effective control strategy.

However, such a sensor will give the same output under a wide variety of conditions. For example, a larger but cooler pool can give the same feedback signal, as can a smaller but hotter pool. A pool of a given surface area and average temperature can take on any shape while giving a constant signal, a significant factor when considering that pool shape depends on both the laser power and the traverse rate. Thus, keeping this sensor's output constant provides very little useful control over the dimensional tolerances and surface finish of the final component.

Another possibility would be to include some direct information about the temperature of the region of the molten pool. This can be done, for example, by using a non-imaging two-color pyrometer to measure an averaged temperature of the region, in addition to the total amount of radiation therefrom. Again, however, this strategy is not terribly effective. All else held constant, the total area of the molten pool is nearly constant as a function of traverse velocity, whereas the maximum temperature within the pool tends to reduce sharply as the velocity increases. The suggested control mechanism would therefore tend to increase the laser power in response to an increase in traverse velocity, which would result in a larger pool, changing both the width and thickness of the features being written. As a result, such a control mechanism, which has been suggested in the past, is not very effective in controlling the dimensions of the workpiece, either parallel or perpendicular to the growth surface.

The above discussion makes clear that choice of the intrinsic parameters to be used for closed-loop feedback is neither a simple matter, nor to be approached by random experimentation. This is the natural result of the extraordinarily complex growth process, in which a large number of process parameters interact via non-linear mechanisms to determine the intrinsic parameters.

Applicants have discovered that certain spatially-dependent characteristics of the optical radiation emitted from the region surrounding the locus can be effectively used as intrinsic parameters for growth feedback control. Such characteristics include, but are not limited to, thermal information that can be derived from analysis of images of the near-locus region. It appears that the stability of the growth process is greatest if the temperature distribution of the near-locus region is held constant.

Applicants have found that this condition, although very effective, is not required for effective operation of a closed-loop feedback controller. The most important factor is the inclusion of spatial extent of a thermal characteristic in the intrinsic parameter chosen for feedback control purposes.

At simplest, consider a system including an imaging sensor which provides a series of single-passband images of the near-locus region, which allow the thermal radiation intensity from the near-locus region to be determined across the image. (Essentially this is a gray-scale image in a passband.)

In this example, each image is decomposed by means of an image analyzer into a series of isophotes. Note that, although technically an isophote is a line of constant radiation emission per unit area in the passband of the imaging sensor, in this specification it is being used in a broader sense, to refer to physically significant curves which can be determined by image analysis. General examples would include traditional isophotes, isoemissivity lines, isotherms, liquid-melt interface lines, and the like.

The emission per unit area in a given passband is related to the temperature and the emissivity of the surface through the usual thermal radiation equations, but keeping the measured emission constant does not guarantee keeping the temperature constant. Despite this, Applicants find that reasonably good control over the LENS growth process is obtained when the area of a single closed isophote surrounding the locus is chosen as the intrinsic parameter for feedback control, especially when combined with the choice of laser power as the controllable parameter.

Further improvement is seen when additional information concerning the absolute temperature of the near-locus region is obtained. For example, if the signal from a non-imaging one-color pyrometer having a passband different from that of the one-color imaging sensor is also available, the combined inputs can be analyzed to determine isophote area and the approximate temperature at the hottest part of the molten pool. These two intrinsic parameters can be used for feedback control—a useful pair of controllable parameters being either laser power and laser focus or laser power and traverse velocity.

Further improvement can be had by using a two-color imaging sensor, where the passbands of the two colors are sufficiently distinct to allow determination of temperature and emissivity at all points in the image. Relatively simple analysis can now obtain the wide variety of general isophote curves described above.

Additional information can be obtained in terms of characteristic thermal differences. Characteristic thermal differences describe a variety of physical characteristics, including the maximal local temperature in the liquid pool, the magnitude of the thermal gradient at the point of maximal local temperature opposite to the direction of traverse of the locus (a trailing thermal gradient), the trailing thermal gradient in the solid immediately behind the pool, and the like. Such differences speak to the distribution of temperature around the selected isophote.

Similar information can be obtained by requiring not only that the area of the selected isophote be held constant, but that the shape also be held constant. These intrinsic parameters, however, are more difficult to transform cleanly into a set of control values which control the feedback process. Such problems, however, are well within the realm of modern control theory and dynamic feedback compensators. When such multi-variate feedback control problems become sufficiently difficult, it is often useful to apply neural network and/or fuzzy logic approaches to obtain a practical control apparatus.

Both the imaging sensor and the image analyzer represent fairly conventional technology. Typical imaging sensors will comprise combinations of CCD matrices, perhaps combined with bandpass filters, and the electronics required to convert the information on incident optical intensity which is locally stored on the CCD photoelements into imaging data that can be used for display and/or image analysis. Additional information which is useful for feedback control according to the present invention can be obtained using non-imaging pyrometers. Finally, the sensor can be equipped so as to directly measure the thickness of the layer being deposited, e.g., by optical triangulation. This can be a very useful addition, as layer thickness is difficult to control with purely thermal image data.

Figure 3:
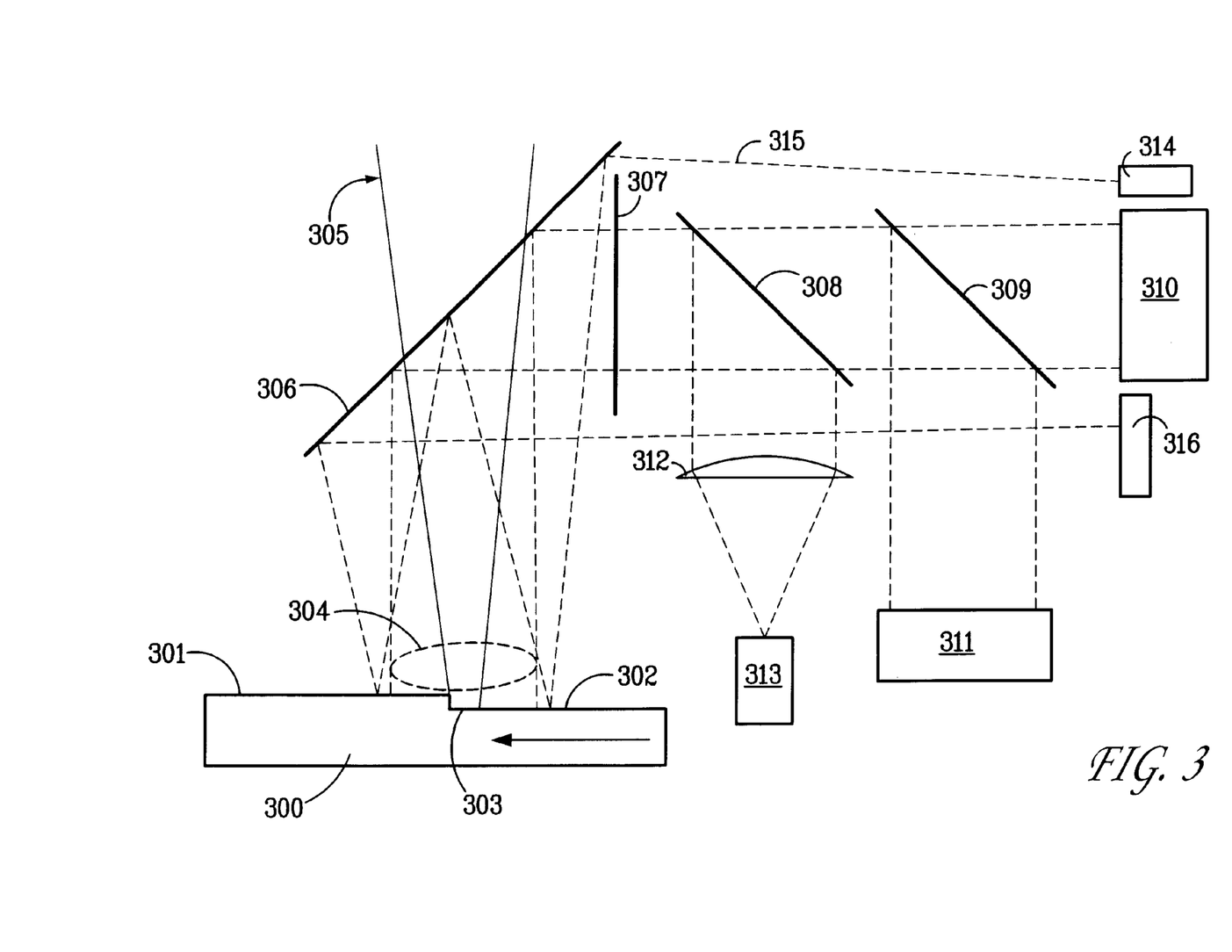
FIG. 3 shows a schematic diagram of a general image sensor suited for practice of the instant invention.

FIG. 3 shows a schematic illustration of a general image sensor suited for practice of the instant invention. All features described above are implemented, which is not required for function of the instant invention, but which improves efficiency of presentation.

Growing component 300 is shown as moving to the left, with 301 indicating the growth surface after the locus 303 has passed, and 302 indicating that portion of the growth surface to which the layer presently being grown has not yet been added. Locus 303 is where the LENS laser 305 intersects the component, and field of view 304 indicated the region on which the imaging sensor is directed. First beamsplitter 306 is oriented to reflect the image away from the axis of laser 305, and is treated so as to pass light at the laser wavelength with minimal absorption, but also to have efficient transmission at the wavelengths desired for thermal imaging. Notch filter 307 acts to further reject light originating with laser 305, but allows other wavelengths of interest to pass freely.

Second beamsplitter 308 is oriented to split a portion of the imaging light off from the main path, and direct it through lens 312 into non-imaging photodetector 313. (Alternately, 313 could be a non-imaging pyrometer.) Second beamsplitter 308 works best if it has constant transmission and constant reflectivity over the thermal radiation image. Either photodetector 313 is sensitive only to a first passband of the thermal image radiation, or an auxiliary filter (not shown) is inserted to narrow the sensitivity of photodetector 313 to said first passband.

Third beamsplitter 309 divides the remaining light from the imaging area 304 into inputs for two imaging cameras, 310 and 311. The two cameras must detect radiation from different passbands, so that their images can be combined to separate surface emissivity from surface temperature. This can be accomplished by choosing third beamsplitter 309 to be dichroic, so that it strongly reflects in a second passband but strongly transmits in a third passband. Alternatively, cameras 310 and 311 may by virtue of their design be sensitive only to the second or third passband, respectively. Finally, auxiliary filters (not shown) can be introduced to limit the spectral sensitivity of these cameras. These two cameras and their associated optics act as a two-color imaging pyrometer.

Note that it may prove useful or convenient to use a multi-color imaging system for this purpose. Examples would include use of a conventional color video camera, or CCD camera, where the "color" information is not continuous, but actually represents the amount of light within specific passbands, a different passband for each "color". A conventional color CCD camera, for example, provides information on three passbands. If information has to be obtained from a conventional analog video signal, there will be some loss of definition of the original passbands, but the resulting information can still be used for the present purpose.

Finally, an optical triangulator is implemented to directly measure the thickness of the layer being grown. A tightly focused laser beam 315 is directed from triangulation source 314 toward first beamsplitter 306. Beam 315 bounces therefrom onto a point on 302, the surface before growth. The beam reflects therefrom, off the first beamsplitter again, and then off a point on 301, the surface after layer growth. The beam then reflects from the first beamsplitter again, and is detected by linear position sensor 316. The position detected by sensor 316, together with the known geometry of the remainder of the apparatus, can be used to calculate the deposited layer thickness.

At this point, it is useful to describe the operation of a system after the present invention in the form of a flow chart. A major portion of the functionality is directed by computers guided by operating programs, and it is their essence which is defined by the flow chart.

Figure 4:
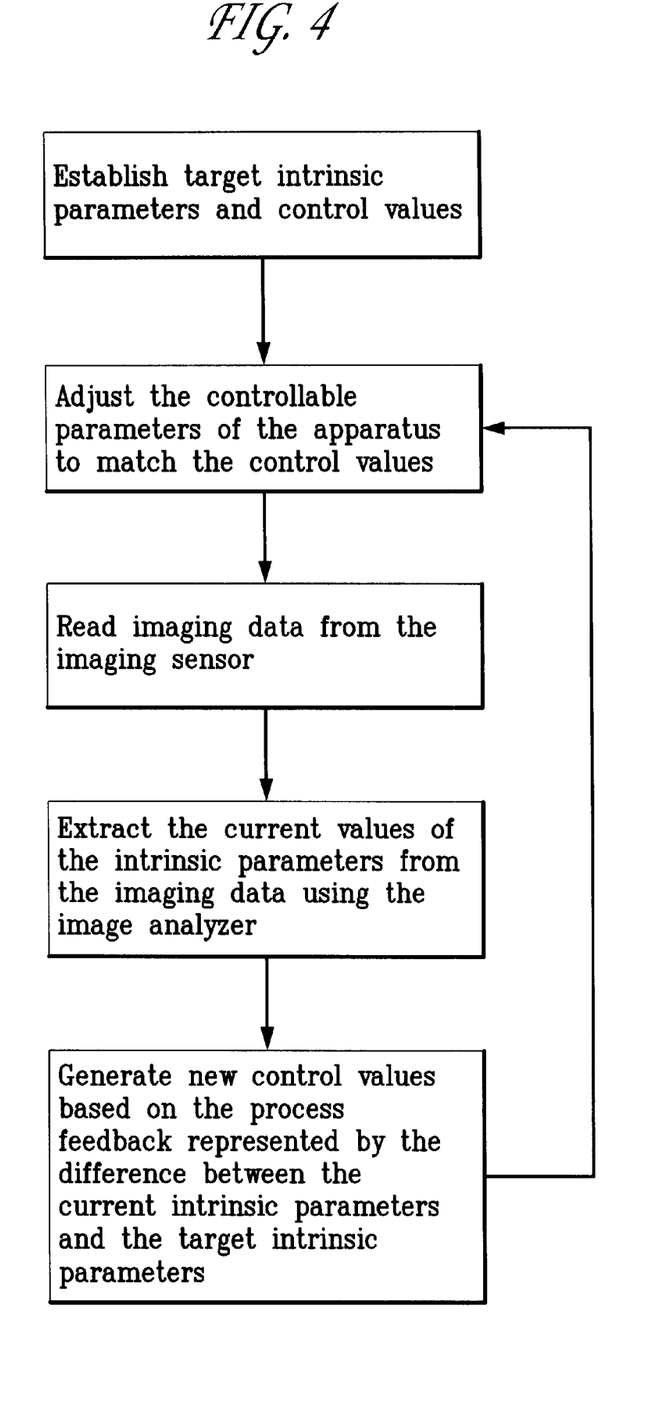
FIG. 4 shows a flow chart of the operation of a simple LENS system with imaging-based feedback control.

FIG. 4 is a flow chart of the operation of a simple LENS system with imaging-based feedback control. The object here is simply to provide a continued smooth operation, rather than introduce the additional complexities of a system which can grow a complete component from a detailed description of a component.

The steps appearing in the flow chart in FIG. 4 are summarized below:

1. The desired conditions under which growth is wanted to proceed is defined by setting target intrinsic parameters and initial control values for the direct laser fabrication process;
2. The growth process is begun;
3. The controllable parameters of the direct laser fabrication apparatus are adjusted to match the initial control values by the scheduler;
4. Imaging data is obtained from the imaging feedback equipment;
5. The current intrinsic parameters are extracted from said imaging data by an image analyzer;
6. A feedback corrector generates new control values based on a feedback control process which compares the current intrinsic parameters with the target intrinsic parameters; and,
7. The new control values are substituted for the initial control values, and the process loops back to step 3 until the desired growth operation is terminated.

Figure 5:
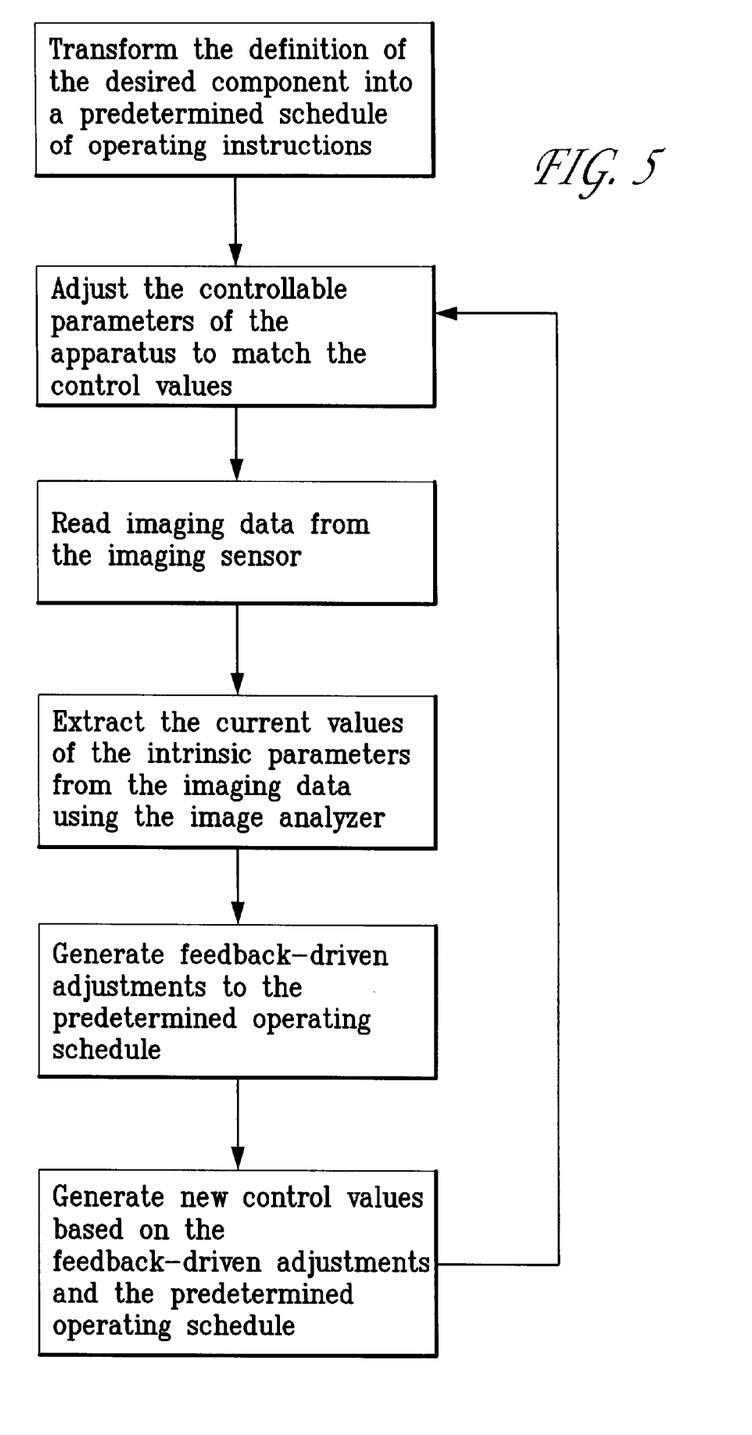
FIG. 5 shows a flow chart of the operation of a programmable LENS system with closed-loop feedback control.

The flow chart above applies to the maintenance and stabilization of an initial set of growth conditions. In FIG. 5 appears the flow chart of one implementation of a system that can be pre-programmed to fabricate a complete component using closed-loop feedback. This process comprises:

1. Transforming the definition of the desired component into a predetermined schedule of operating instructions for the direct laser fabrication apparatus, said schedule including control values for the controllable parameters of the direct laser fabrication apparatus and target intrinsic parameters as a function of time and/or position on the growing component;
2. adjusting the controllable parameters to match the initial control values;
3. reading imaging data from the imaging feedback equipment;
4. extracting the current intrinsic parameters from said imaging data;
5. generating feedback-driven adjustments to the predetermined operating schedule based on a feedback-based control system which compares the current intrinsic parameters with the target intrinsic parameters;
6. generating new control values based on the feedback-driven adjustments and the predetermined operating schedule; and,
7. looping back to step 2, substituting the new control values for the current control values, until the component is fabricated.

One aspect of the above control process should be explained in a bit more detail, although it is quite standard in the field of control systems. That is the modification of a predetermined operating schedule based on adjustments which are required by a feedback controller.

As a simple example, the predetermined operating schedule at some point might call for laser power x, and traverse velocity vector y, these parameters to held for a period of t seconds. During that time the target intrinsic parameters are that a given isotherm has an area A, and the growing layer thickness is L. However, the measured area $A_m$ is too small when the predetermined controllable parameters are used. As a result, the laser power is increased to a level where the area is correct. In doing so, however, the growing layer thickness becomes too small. To correct for this effect, the predetermined operating schedule is changed so that not only is the laser power increased, and the traverse velocity is decreased to obtain the correct layer thickness, but the duration for which these process parameters will be held is also increased, so that the feature length attains the correct value. Clearly there are many approaches toward such adjustments, and all are intended to be included in the present invention.

The above flow charts assume certain characteristics of the direct fabrication apparatus. However, this is the result of considering specific implementations, whereas the present invention is intended to cover all implementations consistent with the claims and the specification.

We claim:

1. A feedback controlled direct laser fabrication system, comprising:

a) a direct laser fabrication apparatus, said apparatus comprising:
   i) a laser whose output is directed onto a locus on a growth surface;
   ii) a growth material feeder which delivers growth material to the region immediately surrounding said locus;
   iii) a traverse mechanism moving the locus in three dimensions about the growth surface; and,
   iv) a regulator which adjusts a set of controllable parameters of said apparatus to match control values generated by a scheduler;

b) a two-color imaging pyrometer comprising imaging optics which form an image of the region immediately surrounding the locus, a dichroic beamsplitter to split said image into a first image at a first optical passband and a second image at a second optical passband, a first imaging camera directed at said first image, and a second imaging camera directed at said second image, where the first imaging camera delivers said first image in the form of a first set of imaging data, where said first set of imaging data comprises the distribution of optical intensity within said first image, and the second imaging camera delivers said second image in the form of a second set of imaging data, where said second set of imaging data comprises the distribution of optical intensity within said second image; and, c) a feedback system, comprising:
  i) an image analyzer, which accepts said first set of imaging data and said second set of imaging data and extracts therefrom a set of current intrinsic parameters;
  ii) a database comprising a predetermined operating schedule for fabricating a given component, and a set of target intrinsic parameters;
  iii) a corrector, which accepts as input the set of current intrinsic parameters, the set of target intrinsic parameters, and the predetermined operating schedule, and generates feedback-driven adjustments to said predetermined operating schedule therefrom; and,
  iv) said scheduler which accepts as input the feedback-driven adjustments, and the predetermined operating schedule for fabricating a given component, generates therefrom control values for the controllable parameters, and transfers said control values to the regulator.

2. A feedback controlled direct laser fabrication system, comprising:
  a) a direct laser fabrication apparatus, said apparatus comprising:
    i) a laser whose output is directed onto a locus on a growth surface;
    ii) a growth material feeder which delivers growth material to the region immediately surrounding said locus;
    iii) a traverse mechanism moving the locus in three dimensions about the growth surface; and,
    iv) a regulator which adjusts a set of controllable parameters of said apparatus to match control values generated by a scheduler;
  b) a two-color imaging pyrometer comprising a first imaging camera with a first filter which passes light within a first optical passband, a second imaging camera with a second filter which passes light within a second optical passband, both imaging cameras being directed at the region immediately surrounding the locus, where the first imaging camera delivers a first image in the form of a first set of imaging data, where said first set of imaging data comprises the distribution of optical intensity within said first image, and the second imaging camera delivers a second image in the form of a second set of imaging data, where said second set of imaging data comprises the distribution of optical intensity within said second image; and,
  c) a feedback system, comprising:
    i) an image analyzer, which accepts said first set of imaging data and said second set of imaging data and extracts therefrom a set of current intrinsic parameters;
    ii) a database comprising a predetermined operating schedule for fabricating a given component, and a set of target intrinsic parameters;
    iii) a corrector, which accepts as input the set of current intrinsic parameters, the set of target intrinsic parameters, and the predetermined operating schedule, and generates feedback-driven adjustments to said predetermined operating schedule therefrom; and,
    iv) said scheduler which accepts as input the feedback-driven adjustments, and the predetermined operating schedule for fabricating a given component, generates therefrom control values for the controllable parameters, and transfers said control values to the regulator.

3. A feedback controlled direct laser fabrication system, comprising:
  a) a direct laser fabrication apparatus, said apparatus comprising:
    i) a laser whose output is directed onto a locus on a growth surface;
    ii) a growth material feeder which delivers growth material to the region immediately surrounding said locus;
    iii) a traverse mechanism moving the locus in three dimensions about the growth surface; and,
    iv) a regulator which adjusts a set of controllable parameters of said apparatus to match control values generated by a scheduler;
  b) an imaging sensor directed at the region immediately surrounding the locus, and delivering an image thereof in the form of imaging data; and,
  c) a feedback system, comprising:
    i) an image analyzer, which accepts said imaging data from said imaging sensor and extracts therefrom a set of current intrinsic parameters comprising a measured characteristic thermal difference;
    ii) a database comprising a predetermined operating schedule for fabricating a given component, and a set of target intrinsic parameters comprising a target characteristic thermal difference;
    iii) a corrector, which accepts as input the set of current intrinsic parameters, the set of target intrinsic parameters, and the predetermined operating schedule, and generates feedback-driven adjustments to said predetermined operating schedule therefrom; and,
    iv) said scheduler which accepts as input the feedback-driven adjustments, and the predetermined operating schedule for fabricating a given component, generates therefrom control values for the controllable parameters, and transfers said control values to the regulator.

4. The system of claim 3, wherein the feedback-driven adjustments comprise an adjustment to the laser power directed onto the locus so that the measured characteristic thermal difference is substantially equal to the target characteristic thermal difference.

5. The system of claim 3, wherein the feedback-driven adjustments comprise an adjustment to the traverse velocity of the locus along the growth surface so that the measured characteristic thermal difference is substantially equal to the target characteristic thermal difference.

6. The system of claim 5, wherein the feedback-driven adjustments further comprise adjustments to the rate at which the growth material feeder delivers growth material, so as to maintain a constant growth layer thickness.

7. The system of claim 3, wherein the feedback-driven adjustments comprise adjustments to the laser focus so that the measured characteristic thermal difference is substantially equal to the target characteristic thermal difference.

8. An intrinsic parameter feedback controlled direct laser fabrication system, comprising:
  a) a direct laser fabrication apparatus, said apparatus comprising:
    i) a laser whose output is directed onto a locus on a growth surface;
    ii) a growth material feeder which delivers growth material to the region immediately surrounding said locus;
    iii) a traverse mechanism moving the locus in three dimensions about the growth surface; and, iv) a regulator which adjusts a set of controllable parameters of said apparatus to match a set of control values generated by a feedback controller;

b) a two-color imaging pyrometer comprising imaging optics which form an image of the region immediately surrounding the locus, a dichroic beamsplitter to split said image into a first image at a first optical passband and a second image at a second optical passband, a first imaging camera directed at said first image, and a second imaging camera directed at said second image, where the first imaging camera delivers said first image in the form of a first set of imaging data, where said first set of imaging data comprises the distribution of optical intensity within said first image, and the second imaging camera delivers said second image in the form of a second set of imaging data, where said second set of imaging data comprises the distribution of optical intensity within said second image; and, c) a feedback system, comprising:
  i) an image analyzer, which accepts said first set of imaging data and said second set of imaging data, and extracts therefrom a set of current intrinsic parameters; and,
  ii) said feedback corrector, which accepts as input the set of current intrinsic parameters and a set of target intrinsic parameters, generates said set of control values therefrom, and delivers said set of control values to said regulator.

9. An intrinsic parameter feedback controlled direct laser fabrication system, comprising:
  a) a direct laser fabrication apparatus, said apparatus comprising:
    i) a laser whose output is directed onto a locus on a growth surface;
    ii) a growth material feeder which delivers growth material to the region immediately surrounding said locus;
    iii) a traverse mechanism moving the locus in three dimensions about the growth surface; and,
    iv) a regulator which adjusts a set of controllable parameters of said apparatus to match a set of control values generated by a feedback controller;
  b) a two-color imaging pyrometer comprising a first imaging camera with a first filter which passes light within a first optical passband, a second imaging camera with a second filter which passes light within a second optical passband, both imaging cameras being directed at the region immediately surrounding the locus, where the first imaging camera delivers a first image in the form of a first set of imaging data, where said first set of imaging data comprises the distribution of optical intensity within said first image, and the second imaging camera delivers a second image in the form of a second set of imaging data, where said second set of imaging data comprises the distribution of optical intensity within said second image; and, c) a feedback system, comprising:
  i) an image analyzer, which accepts said first set of imaging data and said second set of imaging data, and extracts therefrom a set of current intrinsic parameters; and,
  ii) said feedback corrector, which accepts as input the set of current intrinsic parameters and a set of target intrinsic parameters, generates said set of control values therefrom, and delivers said set of control values to said regulator.

10. An intrinsic parameter feedback controlled direct laser fabrication system, comprising:
  a) a direct laser fabrication apparatus, said apparatus comprising:
    i) a laser whose output is directed onto a locus on a growth surface;
    ii) a growth material feeder which delivers growth material to the region immediately surrounding said locus;
    iii) a traverse mechanism moving the locus in three dimensions about the growth surface; and,
    iv) a regulator which adjusts a set of controllable parameters of said apparatus to match a set of control values generated by a feedback corrector;
  b) an imaging sensor directed at the region immediately surrounding the locus, and delivering an image thereof in the form of imaging data; and,
  c) a feedback system, comprising:
    i) an image analyzer, which accepts said imaging data and extracts therefrom a set of current intrinsic parameters comprising a measured characteristic thermal difference; and,
    ii) said feedback corrector, which accepts as input the set of current intrinsic parameters and a set of target intrinsic parameters comprising a target characteristic thermal difference, generates a set of control values therefrom, and delivers said set of control values to said regulator.

11. The system of claim 10, wherein the new control values effect an adjustment to the laser power directed onto the locus so that the measured characteristic thermal difference is substantially equal to the target characteristic thermal difference.

12. The system of claim 10, wherein the new control values effect an adjustment to the traverse velocity of the locus along the growth surface so that the measured characteristic thermal difference is substantially equal to the target characteristic thermal difference.

13. The system of claim 12, wherein the new control values further effect adjustments to the rate at which the growth material feeder delivers growth material, so as to maintain a constant growth layer thickness.

14. The system of claim 10, wherein the new control values effect adjustments to the laser focus so that the measured characteristic thermal difference is substantially equal to the target characteristic thermal difference.

* * * * *